Figure 1:
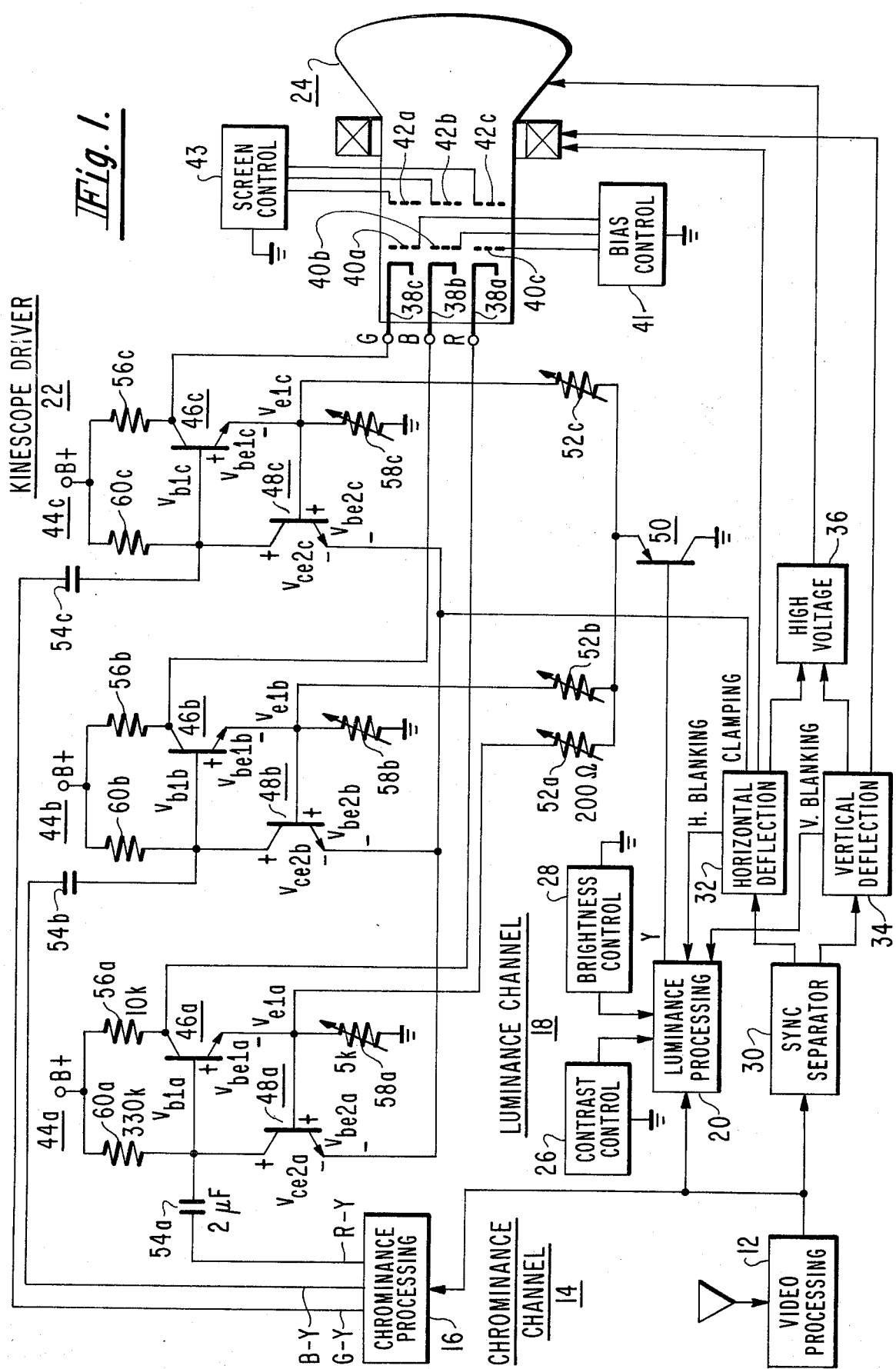

United States Patent [19]

Willis

[11] 3,970,895

[45] July 20, 1976

[54] CIRCUIT FOR MAINTAINING OPERATING POINT STABILITY OF AN AMPLIFIER

[75] Inventor: Donald Henry Willis, Indianapolis, Ind.

[73] Assignee: RCA Corporation, New York, N.Y.

[22] Filed: Sept. 9, 1974

[21] Appl. No.: 504,357

[52] U.S. Cl. .............................. 315/381; 315/383; 315/386
[51] Int. Cl.² ..................................... H01J 29/52
[58] Field of Search ............ 307/228, 237; 325/486; 330/112, 26; 315/381, 383, 386

[56] References Cited
UNITED STATES PATENTS

| | | | |
|---|---|---|---|
| 3,311,900 | 3/1967 | Gaunt, Jr. ........................ | 307/263 X |
| 3,436,563 | 4/1969 | Regitz ............................ | 307/228 X |
| 3,644,669 | 2/1972 | Slavik ............................. | 315/383 |
| 3,780,317 | 12/1973 | Kurata et al. ................... | 307/237 |

Primary Examiner—Maynard R. Wilbur
Assistant Examiner—S. C. Buczinski
Attorney, Agent, or Firm—Eugene M. Whitacre; Peter M. Emanuel

[57] ABSTRACT

An amplifier for driving a color image reproducing device includes a first transistor the base of which is capacitively coupled to a source of color difference signals. The emitter of the first transistor is direct current coupled to the base of a second transistor. The collector of the second transistor is direct current coupled to the base of the first transistor. The emitter of the second transistor is coupled to a source of a predetermined voltage. The emitter of the first transistor is direct current coupled to the emitter of a third transistor of opposite conductivity type which serves as a luminance signal amplifier. The first and third transistors form a matrix amplifier operative to generate a color signal at the collector of the first transistor. The capacitive coupling device and the second transistor form a clamping circuit for maintaining the voltage developed at the emitter of the first transistor substantially independent of direct current conditions of the source of color difference signals and base-to-emitter voltage variations of the first transistor.

7 Claims, 2 Drawing Figures

CIRCUIT FOR MAINTAINING OPERATING POINT STABILITY OF AN AMPLIFIER

This invention relates to apparatus for stabilizing the operating point of electrical signal amplifiers and in particular relates to apparatus for stabilizing the operating point of an amplifier suitable for driving a color kinescope or other image reproducing device.

It is often desirable to maintain the operating point of an amplifier substantially independent of variations of operating conditions of other circuits coupled to the amplifier or variations of the amplifier characteristics related to the environment in which the amplifier operates. Specifically, it is desirable to maintain the operating point stability of a kinescope driver arrangement since variations of the operating point generally produce visible variations in the image generated by the kinescope which may be annoying to the viewer. For instance, variations of the operating point of the driver of a monochromatic kinescope may result in variations of the brightness of the image. Special attention should be given to maintaining the operating point of a color kinescope driver since operating point variations may result in color variations or drifts which are particularly noticeable to the viewer.

Present color television receivers typically employ both luminance and chrominance signal processing channels. Several arrangements are known for matrixing the signals processed in the luminance and chrominance channels to produce a color image on the screen of a color kinescope. In one arrangement, luminance (Y) signals are applied in common to the cathodes of the kinescope and color difference (R-Y, B-Y and G-Y) signals are applied separately through respective driver stages to the first control guides of the kinescope. In this case, matrixing is performed by the kinescope itself.

In another arrangement, matrixing of the luminance and chrominance signals is performed prior to the kinescope by a kinescope driver. In this case, color (R,G,B) signals are applied directly to one set of electrodes (e.g., the cathodes) of the kinescope. An example of such an arrangement is described in U.S. Pat. No. 3,663,745, entitled, "Compensated Television Matrix Amplifier," by John O'Toole, issued May 16, 1972, and assigned to the same assignee as the present invention. In this arrangement, the emitter of a transistor of a first type (e.g., PNP) is coupled in common to the emitter of three transistors of the opposite type to provide the desired matrixing of luminance and chrominance information. The bases of the opposite type transistors are coupled to sources of color difference signals. The opposite type transistors operate in a common emitter mode for the color difference signals. The base of the first type transistor is coupled to a source of luminance signals. By virtue of the emitter coupling, the opposite type transistors operate in a common base mode for the luminance signals. A color signal is taken from the collector of each of the opposite type transistors.

Typically, color picture tubes (kinescopes) contain an electrode arrangement, sometimes called a gun, generally comprising a cathode and at least one grid, for each phosphor of the kinescope. The kinescope driver amplifier includes a stage to drive each of the guns. The operating point and gain of each stage is set up, with respect to other stages, so that in the absence of all the color difference signals a color-free gray tone (thee intensity of the gray tone being solely dependent on the luminance signal) is generated.

Variations of either the operating point or the gain of a driver stage with respect to the other driver stages may result in the generation of an undesirable tint in the image. For instance, if there is an imbalance in favor of red (R) due to a change of the operating point of the red driver stage, images which are supposed to be white will have a red tint (or its color complement).

It should be noted that the quiescent operating point or bias of a stage generally determines the gain of the stage as well as the DC operating conditions of the stage. Thus, by stabilizing the operating point of a stage it is often also possible to stabilize the gain of the stage.

In order to minimize variations of the operating point of an amplifier, it is desirable to isolate the circuit from variations of the direct current (DC) operating conditions of a preceding circuit by, for example, utilizing capacitive coupling to the preceding circuit.

It may also be desirable to reinsert a DC component in a signal which has been capacitively coupled to an amplifier. For this purpose, a DC restoration, reinsertion or clamping circuit may be employed. A general discussion of clamping circuits can be found in the book *Pulse, Digital and Switching Waveforms*, by Millman and Taub, McGraw-Hill Book Company, 1965, Chapter 8, entitled, "Clamping and Switching Circuits."

Because of the nature of the composite television signal in which a reference (synchronizing) level is supplied periodically, so-called keyed clamps are often employed in television video processing apparatus or the like. In keyed clamping arrangements a controllable conduction device is selectively made to conduct (that is, "keyed") during the interval associated with synchronizing pulses or the like to charge a coupling capacitor in order to restore a DC component to a signal coupled by the capacitor. Such clamping circuits have advantages over other types of clamping circuits in that they can be very fast operating with low distortion and high noise immunity and can operate satisfactorily with signal levels much lower than those required for other types of clamping circuits. A keyed clamping circuit useful in a television video processing system is described in U.S. Pat. No. 3,013,116, entitled, "Signal Correction Circuits," by George Sziklai et al., issued Dec. 12, 1961, and assigned to the same assignee as the present invention.

In order to minimize variations of the operating point, it is also desirable to minimize the effect of component variations due to environmental conditions such as temperature as much as possible. For instance, in the type of color kinescope driver described in the aforementioned O'Toole patent, a separate one of the opposite type transistors provides the drive for each gun of the kinescope. Depending on the amplitude and duty cycle of the color difference signals applied to respective drive transistors, the drive transistors will dissipate varying amounts of power. Hence, the drive transistor of each stage of the driver will be subject to different temperatures with respect to the drive transistors of the other stages. As a result, the operating parameters of the drive transistors will vary with respect to one another. Specifically, the base-to-emitter voltage drops of the drive transistors of each stage may not track each other, resulting in non-uniform operating point variations from stage to stage. In order to reduce color imbalances, it is therefore desirable to reduce the effect of variations of the base-to-emitter voltage drops.

Circuit arrangements are known for stabilizing the operating point with respect to variations in environmental conditions. For instance, in U.S. Pat. No. 3,430,155, entitled, "Integrated Circuit Biasing Arrangement for Supplying $V_{be}$ Bias Voltages," by Leopold A. Harwood, issued Feb. 25, 1969, and assigned to the same assignee as the present invention, there is described a biasing circuit useful in maintaining the operating point stability of integrated circuit amplifiers in the presence of temperature and power supply variations. The biasing circuit includes a pair of transistors, one of which is connected in a common emitter type configuration and the other of which is connected in a common collector type configuration. The output electrode of each transistor is connected to the input electrode of the other.

In accordance with the present invention, a circuit is provided which includes first and second devices having first and second electrodes, a conduction path between said first and second electrodes, and a control electrode for controlling the conduction of the conduction path. A signal to be processed is capacitively coupled to the control electrode of the first device. The second electrode of the first device is direct current coupled to the control electrode of the second device. The first electrode of the second device is direct current coupled to the control electrode of the first device. A predetermined signal is selectively applied to the second electrode of the second device to render it conductive. The capacitive coupling device is charged to a voltage such that a corresponding voltage at the second electrode of the first device is determined by the predetermined signal substantially independent of variations of the voltage developed between the control electrode and second electrode of the first device.

Figure 2:
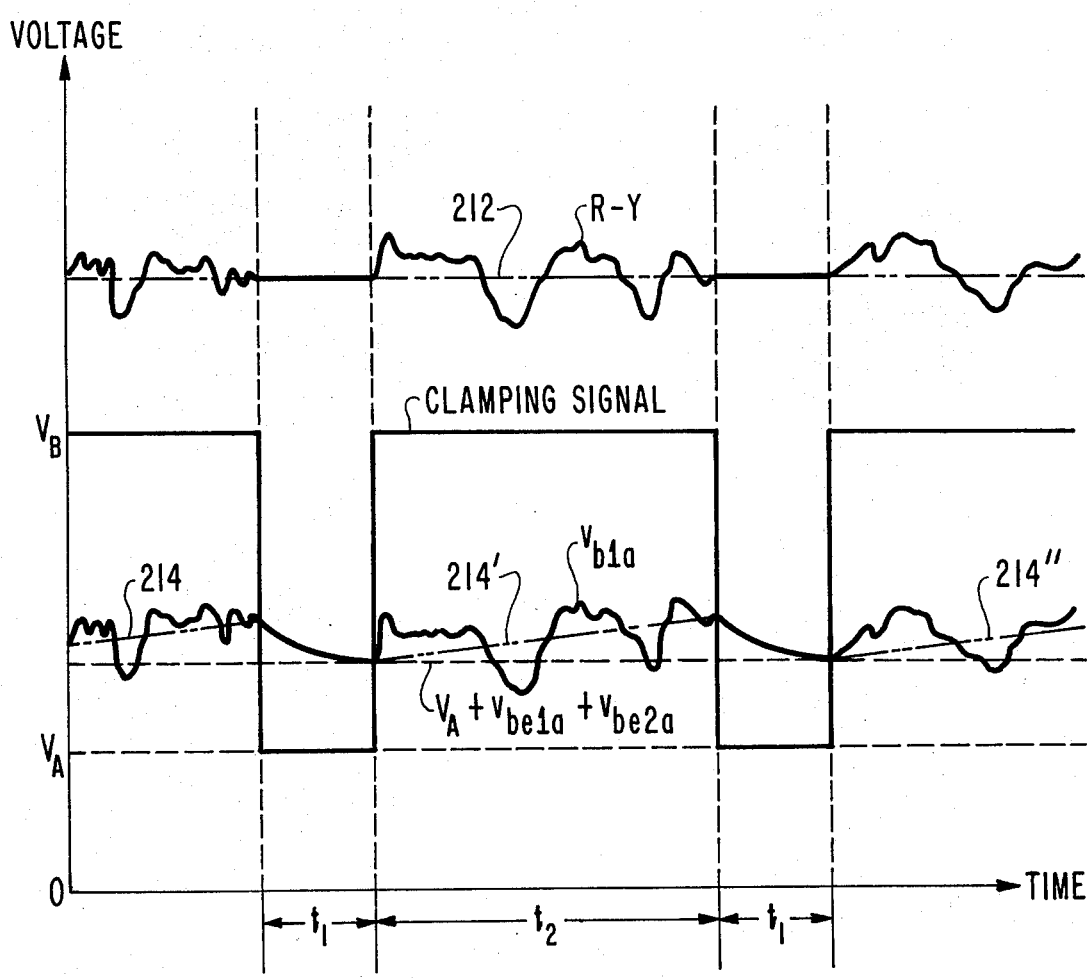

The present invention may be understood by reference to the following detailed description and to the drawings, in which:

FIG. 1 shows the general arrangement of a color television receiver employing the present invention; and FIG. 2 shows waveforms useful in understanding the operation of the arrangement shown in FIG. 1.

Referring now to FIG. 1, the general arrangement of a color television receiver employing the present invention includes a signal processing unit 12 responsive to radio frequency (RF) television signals for generating, by means of suitable intermediate frequency circuits (not shown) and detection circuits (not shown), a composite video signal comprising chrominance, luminance, sound and synchronizing portions. The output of signal processing unit 12 is coupled to a chrominance channel 14, including chrominance processing unit 16 and to a luminance channel 18, including a luminance processing unit 20.

Chrominance processing unit 16 includes chroma demodulators (not shown) to derive color difference signals representing, for example, R—Y, B—Y and G—Y information. These color difference signals are applied to kinescope driver 22, where these signals are matrixed with the output signal, Y, of luminance processing circuit 20 to produce color signals representing, for example, R, B and G information. The color signals are coupled to kinescope 24.

Luminance processing unit 20 serves to relatively attenuate undesirable signal portions, such as chrominance or sound signal portions or both, present in luminance channel 18, while amplifying and otherwise processing the video signals to produce the luminance signal, Y.

Contrast control unit 26 is coupled to luminance processing unit 20 to control the amplitude of the luminance signals and thereby control the contrast of the images produced by kinescope 24. Brightness control unit 28 is coupled to luminance processing unit 20 to control the DC component of the luminance signals and thereby control the brightness of the images produced by kinescope 24. Suitable contrast and brightness control arrangements are described in U.S. Pat. No. 3,804,981, entitled, "Brightness Control," by Jack Avins, issued Apr. 16, 1974, and assigned to the same assignee as the present invention.

Another portion of the output signal from signal processing unit 12 is coupled to sync separator 30 which separates horizontal and vertical synchronization pulses from the video signal. The synchronization pulses are coupled from sync separator 30 to horizontal deflection circuit 32 and vertical deflection circuit 34. Deflection circuits 32 and 34 are coupled to kinescope 24 and high voltage unit 36 to control the deflection or sweep of an electron beam in kinescope 24 in a conventional manner. Deflection circuits 32 and 34 also generate, respectively horizontal and vertical blanking signals. The blanking signals are coupled to luminance processing unit 20 to inhibit its output during the horizontal and vertical retrace periods to insure cutoff of kinescope 24 during these respective periods. Horizontal deflection circuit 32 also generates a clamping signal timed with respect to the horizontal synchronization pulse. The clamping signal is coupled to kinescope drive 22.

A sound channel (not shown) is also provided for processing sound portions of the signals.

The general circuit arrangement shown in FIG. 1 is suitable for use in a color television receiver of the type shown, for example, in RCA Color Television Service Data 1970 No. T19 (a CTC-49 type receiver) published by RCA Corporation, Indianapolis, Ind.

Kinescope 24 may, for example, be a multi-gun kinescope such as a delta-gun, shadow or slotted mask, or precision in-line kinescope or the like. Kinescope 24 contains a gun for each different phosphor, for instance, red, green and blue, deposited on the inside of the face of the kinescope 24. As illustrated, each gun comprises a respective cathode 38a, 38b and 38c; control grid 40a, 40b and 40c; and screen grid 42a, 42b and 42c.

Bias control voltages are coupled to control grids 40a, 40b and 40c from bias control unit 41 and screen control voltages are coupled to screen grids 42a, 42b and 42c from screen control unit 43 to adjust the cutoff point of each gun. The multiplicity of cutoff controls is generally utilized in order to set up kinescope 24 since the operating characteristics of the several guns may be expected to vary one from another. It should be appreciated that the cutoff controls may be simplified depending on the specific gun configuration of kinescope 24. Setup arrangements for specific gun configurations are known—for example, the setup arrangement for the recently announced precision in-line kinescope such as the RCA Type 15VADTCO1 is described in U.S. Pat. No. 3,812,397, issued May 21, 1974, to James Courtland Marsh, Jr., and assigned to the same assignee as the present invention.

Kinescope driver 22 includes stages 44a, 44b and 44c to drive, respectively, each gun of kinescope 24. Since the stages are similar, only stage 44a will be described in detail. Stage 44a comprises an NPN transistor 46a, and NPN transistor 48a and a PNP transistor 50. It should be noted that transistor 50 is common to all three stages 44a, 44b and 44c.

Opposite conductivity type transistors 46a and 50 have their emitter electrodes coupled together through variable resistor 52a. The base of transistor 46a is capacitively coupled through capacitor 54a to the R—Y signal output of chrominance processing unit 16. The base of transistor 50 is direct current coupled to the Y signal output of luminance processing unit 20. The collector of transistor 46a is coupled through resistor 56a to a source of relatively positive operating voltage (B+). The emitter of transistor 46a is coupled through variable resistor 58a to a source of relatively negative voltage (shown as ground). The collector of transistor 46a is direct current coupled to the cathode of the red (R) gun of kinescope 24.

Transistors 46a and 50 cooperate to matrix the R—Y color difference signal and the luminance signal (Y) to produce the R color signal at the collector of transistor 46a. Transistor 46a operates in a common emitter mode to amplify the R—Y color difference signal. By virtue of the emitter coupling of transistors 46a and 50, transistor 46a operates in a common base mode to amplify the luminance signal (Y).

As will be seen, variable resistors 58a may be adjusted to determine the quiescent operating point of stage 44a. Variable resistor 52a may be adjusted to control the magnitude of the voltage gain of stage 44a. This may be understood by recalling that the voltage gain of both the common base and common emitter configurations is determined by the ratio of the collector impedance to the emitter impedance. It is noted that the input to the common base configuration of stage 44a is taken as the emitter of transistor 50. It is further noted that with the typical component values as shown in FIG. 1 the emitter impedance of transistor 46a for gain purposes is determined by resistor 52a. Alternatively, resistor 56a may be a variable resistor and serve to adjust the gain of stage 44a.

Although resistors 56a and 58a need not be variable, it should be noted that the provision of variable resistors may be particularly desirable in situations where it is expected that the tolerances of the operating characteristics of the particular type of kinescope employed extend over a wide range. For example, the kinescope driver arrangement shown in FIG. 1 also may be employed to drive a precision in-line type of kinescope (not shown) since precision in-line kinescopes have exhibited a relatively wide range of operating characteristic tolerances.

Furthermore, in precision in-line kinescopes, only a single first control grid and a single screen grid are provided for the three guns. Thus, there is no provision in this type of kinescope for separate adjustment of red, green and blue gun, screen and grid potentials; and only the cathodes of the three guns are available for separate adjustment of the cutoff point of the guns. For these reasons, the kinescope driver arrangement shown in FIG. 1 may be advantageously employed to drive a precision in-line type of kinescope.

Transistor 48a and capacitor 54a are included in a clamping circuit. The base of transistor 48a is direct current coupled to the emitter of transistor 46a. The collector of transistor 48a is direct current coupled to the base of transistor 46a. Although the base of transistor 48a is shown coupled to the emitter of transistor 46a through a direct connection, the coupling path may include other suitable direct current coupling devices, passive or active, such as resistors or diodes or the like. Similarly, the coupling path between the collector of transistor 48a and the base of transistor 46a may include other suitable direct current coupling devices.

The emitter of transistor 48a is coupled to horizontal deflection circuit 32. Horizontal deflection circuit 32 provides a source of clamping signals which may, in general, include a reference voltage level or a group of selectively applied reference voltage levels (see FIG. 2). When the clamping signal comprises a group of selectively applied reference voltage levels, transistor 48a and capacitor 54a are included in a circuit which is sometimes known as a keyed clamping circuit. As will be seen, transistor 48a, capacitor 54a and resistor 60a cooperate such that the DC component of the signal developed at the emitter of transistor 46a is determined by the clamping signal substantially independent of variations of the voltage between the base and emitter of transistor 46a.

Resistor 60a is coupled between B+ and the base of transistor 46a and serves to supply bias current to the base of transistor 46a and charging current to capacitor 54a. Resistor 60a performs the function of what is sometimes called a bleeder resistor. It should be noted that due to the relatively higher input impedance of the common emitter arrangement of transistor 46a, only a small amount of current supplied by resistor 60a is used to bias transistor 46a. The value of resistor 60a is small enough so that sufficient base current is available to drive transistor 46a. The value of capacitor 54a is large enough so that the charging time constant determined by capacitor 54a and resistor 60a is relatively large in relation to the time duration between the application of reference voltage levels to the emitter of transistor 48a. The value of capacitor 54a also is large enough to couple the AC component of the R—Y color difference signal to the base of transistor 46a with little distortion and with little attenuation.

Typical component values for stage 44a are indicated in FIG. 1. The values for variable resistors 52a and 58a represent nominal values.

In operation, R, G and B color signals are developed at the collectors of transistors 46a, 46b and 46c, respectively, and applied to cathodes 38a, 38b and 38c, respectively. Unequal variations of the operating points of stages 44a, 44b and 44c result in undesirable color imbalances which may be particularly noticeable to the viewer.

The operating points of stages 44a, 44b and 44c are primarily determined by the quiescent values of the emitter currents of respective transistors 46a, 46b and 46c, which currents, in turn, are determined by the respective quiescent values of emitter voltages $v_{ela}$, $v_{elb}$ and $v_{elc}$. Voltages $v_{ela}$, $v_{elb}$ and $v_{elc}$ are equal to respective base voltages $v_{bla}$, $v_{blb}$ and $v_{blc}$, less respective base-to-emitter voltages $v_{beta}$, $v_{belb}$ and $v_{belc}$. Therefore, the operating point of each stage will vary with variations of the quiescent value of the respective base voltage and base-to-emitter voltage.

Since the DC conditions at the R—Y, B—Y and G—Y outputs of chrominance processing unit 16 will tend to vary and will, in general, vary with respect to one another, it is desirable to isolate each stage 44a, 44b and 44c from the DC conditions of chrominance processing unit 16 to stabilize the quiescent values of $v_{bla}$, $v_{blb}$ and $v_{blc}$.

The operating temperature of transistors 46a, 46b and 46c will vary with the power dissipated by and the thermal properties of the respective transistors. Since transistors 46a, 46b and 46c are driven by different color difference signals, the temperatures of the respective transistors will, in general, vary with respect to one another. The voltage developed between the base and the emitter of a transistor is dependent on the temperature to which the transistor is subjected. Therefore, since $v_{bela}$, $v_{belb}$ and $v_{belc}$ will tend to vary and, in general, vary with respect to one another, it is desirable to eliminate the effect of these base-to-emitter voltage variations on the establishment of the quiescent value of the respective emitter voltage.

The clamping circuit comprising capacitor 54a and transistor 48a is operative to stabilize the operating point of stage 44a. Specifically, the quiescent emitter voltage $v_{ela}$ of transistor 46a is substantially maintained independent of the DC conditions of chrominance processing unit 16 and variations of the voltage developed between the base and emitter, $v_{bela}$, of transistor 46a. The operating points of stages 44b and 44c are similarly stabilized. Thus, color imbalances due to unequal variations of the DC components of the R—Y, B—Y and G—Y color difference signals and $v_{bela}$, $v_{belb}$ and $v_{belc}$, are substantially prevented.

To facilitate the understanding of the operation of the clamping circuit portion of stage 44a, concurrent reference to FIGS. 1 and 2 will be helpful. FIG. 2 shows several waveforms superimposed on one set of axes representing signals developed in the color television receiver shown in FIG. 1. The waveforms are labelled "CLAMPING SIGNAL," "R—Y," and "$v_{bla}$" and represent, respectively, the clamping signal generated by horizontal deflection circuit 32, the R—Y color difference signal generated by chrominance processing unit 16, and the signal developed at the base of transistor 46a. The clamping signal includes a horizontal trace interval, $t_2$, during which the kinescope beam is swept across one horizontal line, and a horizontal retrace interval, $t_1$, during which the kinescope beam is returned to the beginning of the next horizontal line. No color difference information is present during the retrace interval.

The DC component, indicated by phantom line 212, of the R—Y color difference signal is removed by capacitor 54a. Thus, the operation of the stage 44a is isolated from the DC conditions of chrominance processing unit 16.

A DC component is reinserted in the AC component of the R—Y color difference signal to develop the signal $v_{bla}$ in the following manner. During the horizontal trace intervals, $t_2$, transistor 48a is in a cutoff condition by virtue of the relatively high positive voltage level, $V_B$, of the clamping signal applied to the emitter of transistor 48a. During these intervals a rising component of voltage is added to $v_{bla}$, as indicated by phantom lines 214, 214' and 214'', due to the charging current supplied by resistor 60a to capacitor 54a. It is noted that this rising component of $v_{bla}$ is different for each interval $t_2$ and depends on the base current drawn by transistor 46a. This base current is determined by the R—Y color difference signal and the luminance signal component supplied by transistor 50. It is also noted, however, that the rising component of $v_{bla}$ is, in any case, small due to the long time constant provided by resistor 60a and capacitor 54a.

During the horizontal retrace intervals, transistor 48a is rendered conductive by virtue of the relatively low voltage level, $V_A$, of the clamping signal applied to the emitter of transistor 48a. During this interval, $v_{bla}$ rapidly falls to $V_A+v_{bela}+v_{be2a}$ (where $v_{be2a}$ is the voltage developed between the base and emitter of transistor 48a) due to the low impedance discharge path provided for capacitor 54a by the now conductive transistor 48a. This drop in $v_{bela}$ is limited to $V_A+v_{bela}+v_{be2a}$ because any further drop in $v_{bla}$ will cause a corresponding drop in $v_{ela}$ (the base voltage of transistor 48a) below the voltage necessary to sustain conduction of transistor 48a.

Thus, because of the rapid fall of $v_{bla}$ to clamping level $V_A$ during the horizontal retrace interval and the small rising component of $v_{bla}$ during the horizontal trace period, $v_{bla}$ is substantially clamped to clamping level $V_A+v_{bela}+v_{be2a}$.

Transistors 48a and 46a cooperate to clamp $v_{ela}$ to a value substantially independent of $v_{bela}$. Transistor 48a will conduct during retrace interval $t_1$ if $v_{ela}$ is equal to $V_A+v_{be2a}$. The above equation continues to control $v_{ela}$ while transistor 48a is conducting. Thus, $v_{ela}$ is clamped to $V_A+v_{be2a}$, a value independent of $v_{bela}$.

The cooperation of transistors 48a and 46a to stabilize the operating point of transistor 48a may also be understood by considering their arrangement a negative feedback arrangement. In the configuration of transistors 48a and 46a, wherein the output electrode of each transistor is connected to the input electrode of the other transistor, a change of voltage at the output electrode of one transistor produces a corresponding change at the input of the other transistor which tends to counteract the change. Thus, for example, if the $v_{ela}$ tends to decrease, due to an increase of $v_{bela}$, transistor 48a will conduct less heavily, thereby increasing $v_{bla}$. As a result, $v_{ela}$ is increased.

It is noted that whereas $v_{ela}$ is independent of $v_{bela}$, $v_{ela}$ is dependent on $v_{be2a}$. However, $v_{be2a}$ is relatively stable since the temperature of transistor 48a remains relatively low because of the relatively low power dissipated by transistor 48a. The low power dissipation of transistor 48a may be understood by recognizing that transistor 48a conducts a relatively small amount of average collector current at a relatively small collector-to-emitter voltage ($v_{bela}+v_{be2a}$, typically 1.4 volts). It is noted that the temperature conditions of transistors 48b and 48c due to the respective operations of transistors 48b and 48c are similar to that of transistor 48a. Therefore, only insignificant operating point variations of stages 44a, 44b and 44c may be expected due to variations of $v_{be2a}$, $v_{be2b}$ and $v_{be2c}$.

In order to avoid the operating temperatures of transistors 46a, 46b and 46c from affecting $v_{be2a}$, $v_{be2b}$ and $v_{be2c}$ it is desirable to physically locate transistors 48a, 48b and 48c separated from transistors 46a, 46b and 46c. It may also be desirable to physically locate transistors 48a, 48b and 48c in proximity to one another, such as in the same integrated circuit package, to insure that $v_{be2a}$, $v_{be2b}$ and $v_{be2c}$ will tend to track each other in response to temperature conditions.

The clamping circuit of stages 44a, 44b and 44c is particularly desirable for use in a kinescope driver arrangement such as shown in FIG. 1. The bias of transistors 46a, 46b and 46c may be controlled to suit respective gun operating requirements by adjustment of variable resistors 58a, 58b and 58c independent of the DC conditions of chrominance processing unit 16 and substantially independent of the respective base-to-emitter voltages of transistors 46a, 46b and 46c. In addition, the operating point of each stage is substantially independent of variations of the DC conditions of the other stage. That is, without stabilization of the respective quiescent emitter voltages, variations in one stage would affect the operating points of the other stages since the emitters of transistors 46a, 46b and 46c are coupled together through variable resistors 52a, 52b and 52c. Further, since the quiescent emitter voltages developed at the emitter connected ends of resistors 52a, 52b and 52c are maintained substantially equal, substantially no quiescent currents flow through resistors 52a, 52b and 52c. Therefore, the values of variable resistors 52a, 52b and 52c have substantially no effect on the quiescent emitter current of transistors 46a, 46b and 46c. Thus, the bias adjustments are independent of the gain adjustments.

It should be appreciated that the clamping circuit herein described has general application wherever it is desirable to stabilize the operating point of a circuit and is not limited to use in a television receiver. It should also be appreciated that modifications may be made to the clamping circuit in accordance with the requirements of a particular application. For instance, the clamping signal need not be a periodic signal. Furthermore, the configuration of the clamping circuit is not limited to transistors and may employ other suitable three terminal amplification devices such as field effect transistors and vacuum tubes.

What is claimed is:

1. In a television receiver including a color kinescope having a plurality of electron beams forming apparatus, electron beam deflection means to control the scanning and retrace of electron beams generated by said electron beam forming apparatus, a source of luminance signals and a source of a plurality of color difference signals, the combination comprising:
   a plurality of kinescope driver means each for combining a preselected one of said color difference signals and said luminance signals to derive color signals, each of said kinescope driver means including
      first and second semiconductor devices of like conductivity type each having first and second electrodes and a conduction path therebetween and a control electrode for controlling the conduction of the conduction path, said first electrode of said first semiconductor device being direct current coupled to a preselected one of said plurality of said electron beam forming apparatus, said second electrode of said first semiconductor device being direct current coupled to said control electrode of said second semiconductor device, said first electrode of said second semiconductor device being direct current coupled to said control electrode of said first semiconductor device,
   capacitive means for capacitively coupling said preselected one of said color difference signals to said control electrode of said first semiconductor device;
   means for direct current coupling said luminance signals to said second electrodes of each of said first semiconductor devices; and
   means coupled to said deflection means and to said second electrode of each of said second semiconductor devices for selectively applying a direct reference voltage to said second electrode of each of said second semiconductor devices to render it conductive during intervals when said electron beams are being retraced, so that the operating point of each of said kinescope driver means is stabilized in response to said direct reference voltage.

2. The apparatus recited in claim 1 wherein said means for coupling said luminance signals to said second electrodes of each of said first semiconductor devices includes a third semiconductor device of opposite conductivity type to that of said first and second semiconductor devices and having first and second electrodes and a conduction path therebetween and a control electrode for controlling the conduction of said conduction path, said luminance signals being coupled to said control electrode of said third semiconductor device, said second electrode of said third semiconductor device being direct current coupled to said second electrode of each of said first semiconductor devices.

3. The apparatus recited in claim 2 wherein said first, second and third semiconductor devices are transistors having collector, emitter and base electrodes corresponding, respectively, to said first and second and control electrodes of said first, second and third semiconductor devices.

4. The apparatus recited in claim 2 wherein said second electrode of each of said first semiconductor devices aand said second electrode of said third semiconductor device are direct current coupled through a first variable impedance device and wherein said second electrode of each of said first semiconductor devices is direct current coupled to a source of bias voltage through a second variable impedance.

5. The apparatus recited in claim 1 wherein in each of said kinescope driver means said second semiconductor device is physically located at a distance from said first semiconductor device such that temperature conditions of said first semiconductor device do not substantially affect temperature conditions of said second semiconductor device.

6. The apparatus recited in claim 1 wherein each of said kinescope driver means includes means for supplying a direct current component to said control electrode of said first device to charge said capacitive means.

7. The apparatus recited in claim 6 wherein the time charge said capacitive means is relatively long in comparison to the time interval during which said electron beams are being retraced.

* * * * *